United States Patent [19]
Kataumi et al.

[11] Patent Number: 5,615,576
[45] Date of Patent: Apr. 1, 1997

[54] SEALING STRUCTURE FOR AUTOMATIC TRANSMISSION SHIFT CONTROL DEVICE

[75] Inventors: Yoshimasa Kataumi; Yoshihiro Takikawa, both of Kosai, Japan

[73] Assignee: Fuji Kiko Co., Ltd., Tokyo, Japan

[21] Appl. No.: 429,090

[22] Filed: Apr. 26, 1995

[30]     Foreign Application Priority Data

Apr. 28, 1994 [JP] Japan .................. 6-090823

[51] Int. Cl.$^6$ .................................................. F16J 15/50
[52] U.S. Cl. .......................... 74/18.1; 74/18; 74/473 R
[58] Field of Search ........................ 74/473 R, 18, 74/18.1, 18.2, 523, 566

[56]            References Cited

U.S. PATENT DOCUMENTS

| | | | |
|---|---|---|---|
| 3,822,570 | 7/1974 | Fisher | 74/18 X |
| 4,991,457 | 2/1991 | Chen | 74/473 |
| 5,009,122 | 4/1991 | Chaczyk et al. | 74/18.2 X |
| 5,016,738 | 5/1991 | Shirahama et al. | 192/4 A |
| 5,158,259 | 10/1992 | Fujisawa | 74/473 R |
| 5,176,390 | 1/1993 | Lallement | 74/18 X |
| 5,207,124 | 5/1993 | Anderson et al. | 74/878 |
| 5,222,746 | 6/1993 | Van Steenbrugge | 74/18 X |

FOREIGN PATENT DOCUMENTS

| | | |
|---|---|---|
| 352737 | 10/1986 | Germany . |
| 4040955 | 1/1992 | Germany . |
| 4101326 | 7/1992 | Germany ..................... 74/18.1 |
| 5-93950 | 12/1993 | Japan . |
| 794686 | 5/1958 | United Kingdom ............... 74/18.1 |
| 1439906 | 6/1976 | United Kingdom ............... 74/18.1 |

*Primary Examiner*—Vinh T. Luong
*Attorney, Agent, or Firm*—Foley & Lardner

[57]              ABSTRACT

A sealing structure for an automatic transmission shift control device comprises a boot interposed between a vehicle floor and a support member, which is a single piece resinous molding, of the transmission shift control device for providing a seal therebetween, and having on the lower side thereof a first seal projection in contact with the vehicle floor. A looped groove of a trapezoidal cross section is formed on the bottom of the support member. A second looped seal projection of a trapezoidal cross section and fittingly engageable in the groove in the boot is formed in the boot on the upper side of the boot. The first seal projection and the second seal projection are similar in loop shape and are located correspondingly on opposite sides of the boot.

6 Claims, 3 Drawing Sheets

SEALING STRUCTURE FOR AUTOMATIC TRANSMISSION SHIFT CONTROL DEVICE

BACKGROUND OF THE INVENTION

1. Field of the Invention

The present invention relates in general to automatic transmission shift control devices for vehicles and more particularly to a sealing structure for an automatic transmission shift control device.

2. Description of the Prior Art

An automatic transmission shift control device includes a shift lever manually operated to control shift of gears of the transmission. The shift lever is pivotally supported by a box-shaped support member fixed to a vehicle floor, so as to be swingable or rotatable forward and rearward of the vehicle. A control lever is provided to extend away from a pivot portion of the shift lever and penetrates through the vehicle floor to protrude outward of the vehicle body. A connecting link is provided between the control lever and the transmission.

An opening is thus formed in the vehicle floor for allowing turn or rotation of the control lever to prevent ingress of rain, mud, etc., on a road surface into the inside of the vehicle body through the opening, a boot is sealingly placed around the control lever and has a peripheral portion fixedly attached to a vehicle floor portion around the opening to sealingly close the opening.

As shown in FIG. 3, a control lever 1 extends downward through an opening 3a of a vehicle floor 3 and projects outward therefrom. A boot 2 has a seal portion 2a sealingly placed around the control lever 1 and a peripheral portion pushed against the vehicle floor 3 by means of a pan or base plate section 5 of a support member 4. The peripheral portion of the boot 2 is formed with a looped seal projection 6 brought into sealing contact with the vehicle floor 3. The opening 3 of the vehicle floor 3 is thus sealingly closed by the boot 2.

Recently, it has been proposed to form the above described support member 4 out of a resinous material and into one piece. That is, as shown in FIG. 4, a support member 4a has an integral base section 5a formed out of a resinous material into one piece and is adapted to be fixed directly to the vehicle floor 3. In this instance, the height "h" of the base portion 5a equivalent to the above described pan 5 needs to be of a predetermined size in order to retain the strength, and further the width "W1" also needs to be of a predetermined size in order that the base portion 5a can push down the projection 6 in a desired manner. However, the width "W1" is desired to be as small as possible, preferably 2 to 3 mm, since a large thickness variation is not desirable for such a support member 4a molded out of a resinous material into one piece.

Thus, as shown in FIGS. 5 and 6, it has been proposed a sealing structure having a rib projection 4b formed of a resinous material and integral with the base portion 5a of the support member 4a, which portion is fitted in a groove 2b of a rectangular cross section, formed in the peripheral portion of the boot 2a, as described in Japanese Utility Model Provisional Publication No. 59390.

However, since the sealing structure of the above publication is such that the width "W2" of the rib projection 4b adapted to push the seal projection 6 against the vehicle floor 3 is small, a sufficient sealing effect cannot be attained unless the fitting relation between the groove 2b and the projection 4b is severely controlled. Accordingly, the work for fitting the rib projection 4b in the groove 2b becomes very difficult, thus lowering the workability at the time of assembly. When the width of the groove 2b is made wider for making the fitting relation more loose, the rib projection 4b may possibly be moved from a position where it is aligned with the seal projection 6, i.e., from a position where the rib projection 4b and the seal projection 6 are located correspondingly on opposite sides of the boot 2, so that it becomes impossible for the seal projection 6 to be pushed correctly or in a desired manner by the rib projection 4b, thus deteriorating the sealing ability of the structure.

That is, it is important for the sealing structure for providing a seal between the support member made of a resinous molding and the boot. It is important to push the seal projection against the vehicle floor by the face of an object having a proper width since it is impossible to attain a desired sealing ability due to movement of the rib projection relative to the seal projection if the width is improper. Further, it is important for a resinous molding to have a substantially equal thickness (2~3 mm) to attain a good workability and a dimensional accuracy.

SUMMARY OF THE INVENTION

According to an aspect of the present invention, there is provided a sealing structure for a transmission shift control device for a vehicle. The sealing structure comprises a boot interposed between a vehicle floor and the transmission shift control device for providing a seal therebetween, and having a first seal projection in contact with the vehicle floor, means for forming a groove of a trapezoidal cross section in a bottom of the transmission shift control device, and means for forming a second seal projection of a trapezoidal cross section and fittingly engageable in the groove, in the boot.

According to another aspect of the present invention, the first seal projection and the second seal projection are similarly looped in shape and located correspondingly on opposite sides of the boot.

According to a further aspect of the present invention, there is provided a sealing arrangement in a transmission shift control device for a vehicle, which comprises a bottom of the transmission shift control device, a vehicle floor of the automotive vehicle, and a boot interposed between the bottom and the vehicle floor for providing a seal therebetween and having a first looped seal projection in contact with the vehicle floor, wherein the bottom has a looped groove of a trapezoidal cross section, and the boot has a second looped seal projection of a trapezoidal cross section and fitted in the groove.

According to a further aspect of the present invention, there is provided an arrangement in an automatic transmission shift control device for a vehicle. The shift control device has a shift lever and a support member of a single piece resinous molding for pivotally supporting the shift lever. The sealing structure comprises a boot interposed between a vehicle floor and a bottom of the support member for providing a seal therebetween, and having on a lower side thereof a first looped seal projection in contact with the vehicle floor, means for forming a looped groove of a trapezoidal cross section in the bottom of the support member, and means for forming a second looped seal projection of a trapezoidal cross section and fittingly engageable in the groove, in the boot on an upper side thereof, the first seal projection and the second seal projection being similar in loop shape and located correspondingly on opposite sides of the boot.

According to a further aspect of the present invention, the sealing arrangement further comprises a rib projection formed integral with the bottom of the support member. The groove is formed in the rib projection.

According to a further aspect of the present invention, there is provided a sealing arrangement in an automatic transmission shift control device for a vehicle. The shift control device has a shift lever and a support member of a single piece resinous molding for pivotally supporting the shift lever. The sealing arrangement comprises a bottom of the support member, a vehicle floor of the vehicle, and a boot interposed between the bottom and the vehicle floor for providing a seal therebetween and having on a lower side thereof a first looped seal projection in contact with the vehicle floor, wherein the bottom has a looped groove of a trapezoidal cross section, and the boot has on an upper side thereof a second looped seal projection of a trapezoidal cross section and is fitted in the groove; and wherein the first seal projection and the second seal projection are similar in loop shape and located correspondingly on opposite sides of the boot.

The above structure is effective for overcoming the above noted problem inherent in the prior art device.

It is accordingly an object of the present invention to provide a novel and improved sealing arrangement for an automatic transmission shift control device for a vehicle, which sealing arrangement can attain a good and reliable seal with assuredness though can be assembled with ease.

It is a further object of the present invention to provide a novel and improved sealing arrangement of the above described character, which sealing arrangement enables a support member of the shift control device to be molded out of a resinous material into one piece while attaining a good workability and a good dimensional accuracy.

DETAILED DESCRIPTION OF THE PREFERRED EMBODIMENT

Figure 1:
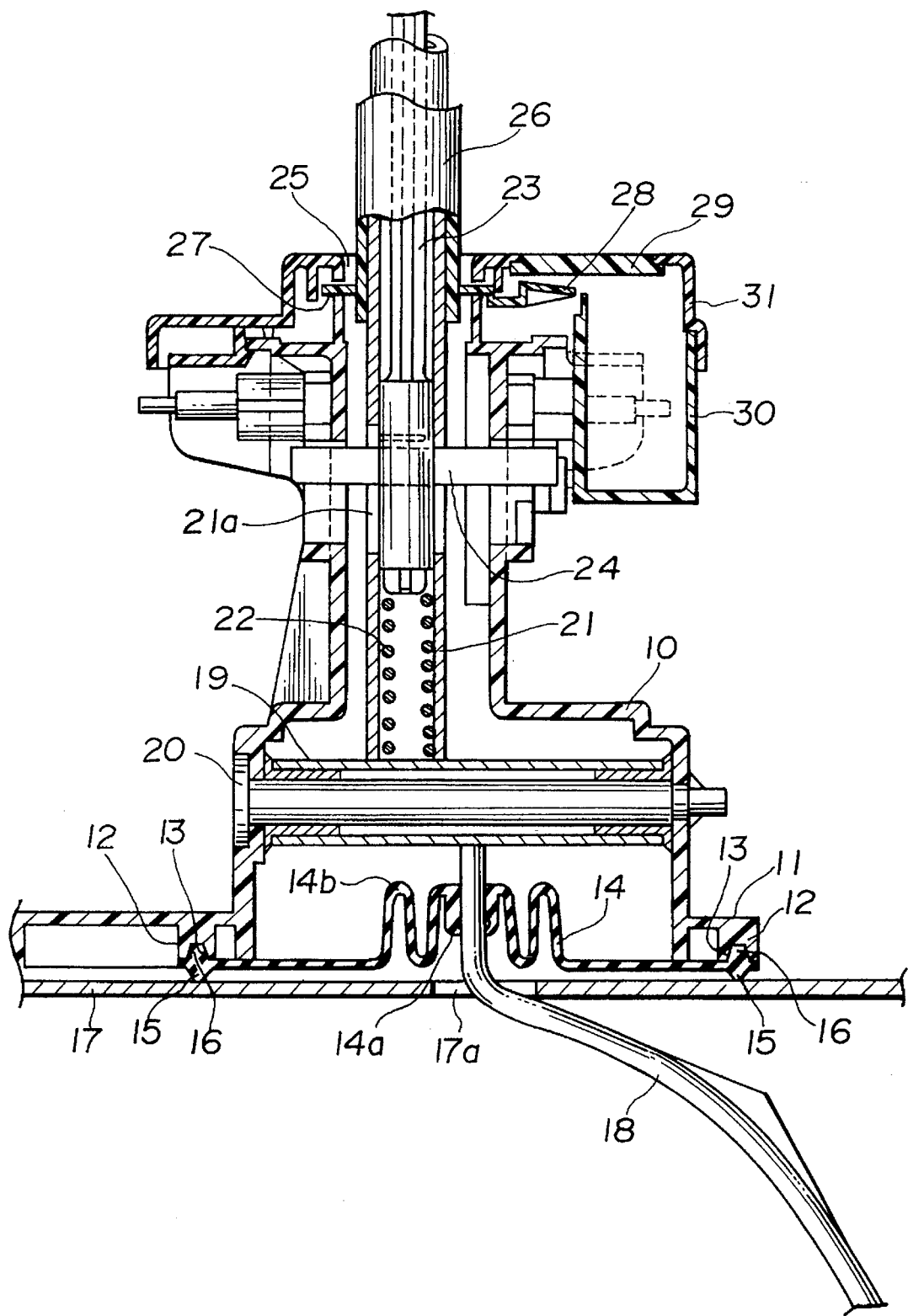
FIG. 1 is a sectional elevation of a sealing structure or arrangement in an automatic transmission shift control device for an automotive vehicle according to an embodiment of the present invention.
Figure 2:
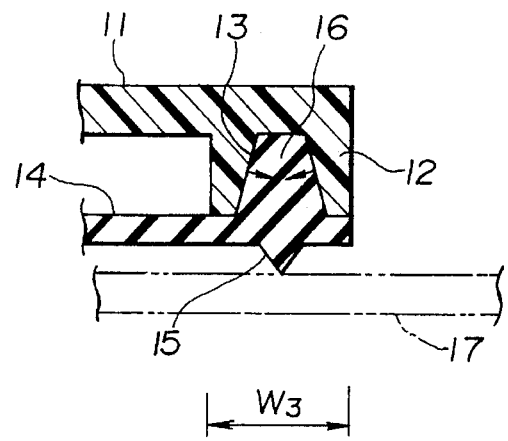
FIG. 2 is an enlarged fragmentary view of the sealing arrangement of FIG. 1.
Figure 3:
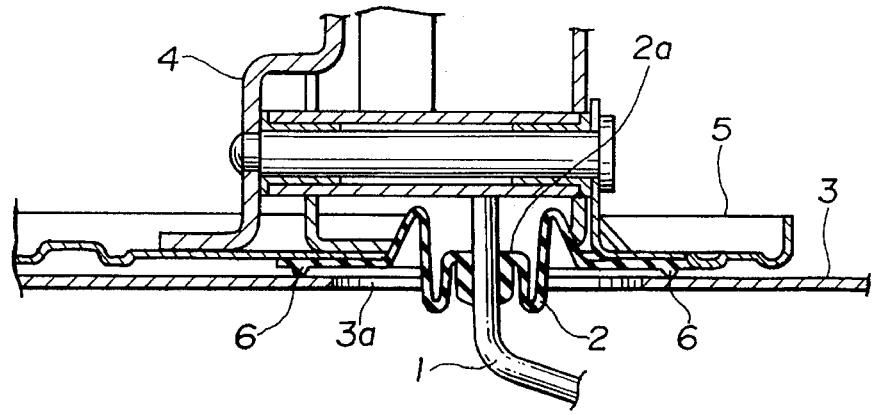
FIG. 3 is a sectional elevation of a prior art sealing structure in an automatic transmission shift control device for an automotive vehicle.
Figure 4:
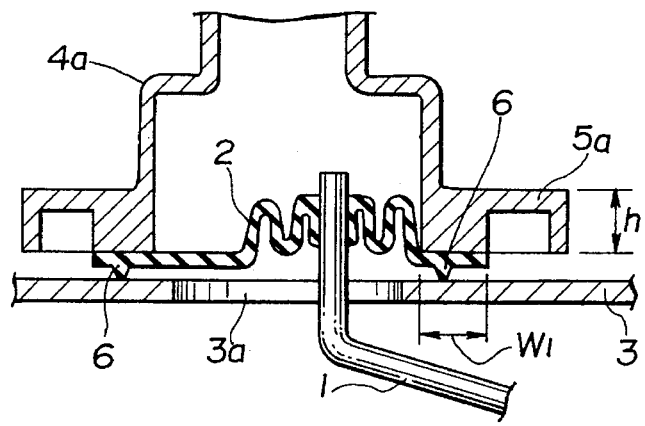
FIG. 4 is a sectional elevation of another prior art sealing structure.
Figure 5:
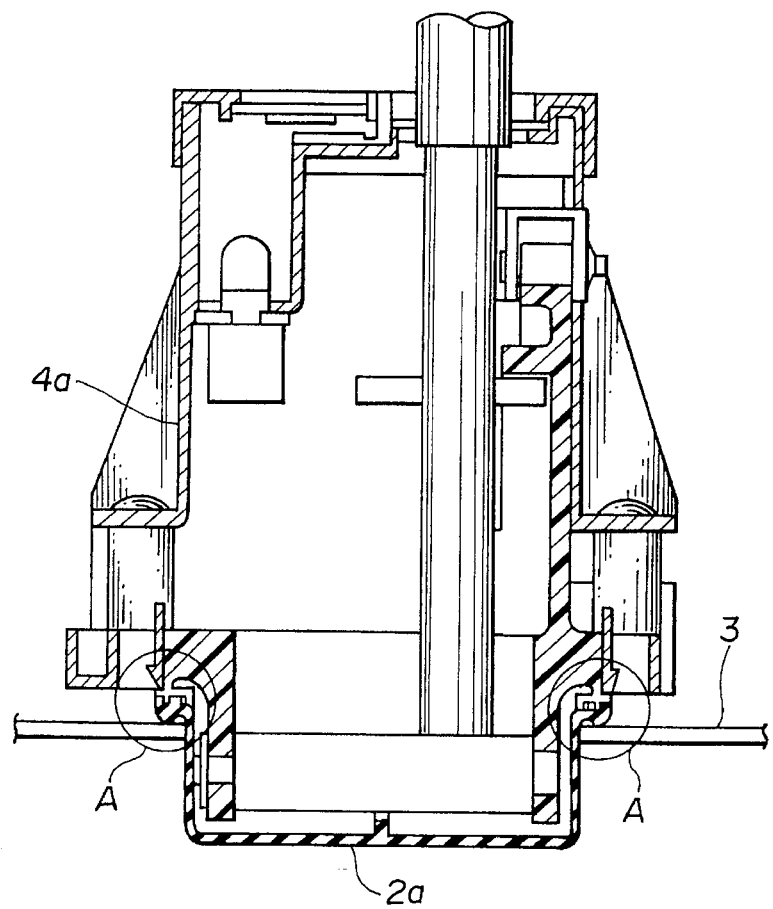
FIG. 5 is a sectional elevation of a further prior art sealing structure.
Figure 6:
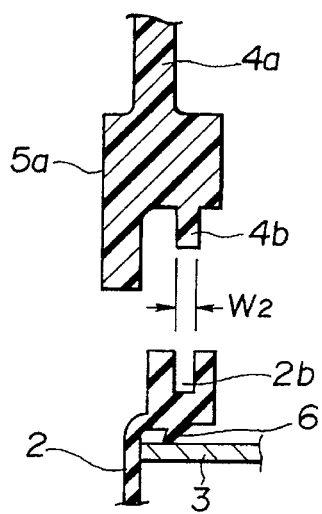
FIG. 6 is an enlarged view of a portion "A" in FIG. 5.

Referring to FIGS. 1 and 2, a sealing arrangement in an automotive transmission shift control device for an automotive vehicle will be described. The transmission shift control device according to an embodiment of the present invention includes a support member 10 of a one-piece resinous molding having a box-like shape. The support member 10 has an integral base portion 11 where it is attached to a vehicle floor 17. The base portion 11 thus serves as a joining portion of the transmission shift control device. A rib projection 12 is formed on the lower surface of the base portion. A groove 13 of a trapezoidal cross section at the bottom of the support member is formed in the rib projection 12. A boot 14 has a first seal projection 15 on the lower side or bottom thereof. On the upper side, at a location corresponding to the first seal projection 15, a second seal projection 16 is fittingly engaged in the groove 13. The groove 13 and the first and second seal projections 15 and 16 have similar loop shapes such as hollow rectangles and circles.

The first seal projection 15 is thus pushed against a vehicle floor 17 by means of the rib projection 12 having the width "W3". Furthermore, since the rib projection 12 is formed with the groove 13, a thickness variation of the support member 10 due to the provision of the rib projection 12 can be smaller. Thus, the design inconvenience that the support member 10 must be locally increased in thickness can be eliminated.

Since the fitting relation between the groove 13 of a trapezoidal cross section and the projection 16 is adapted to enable the upper end portion of the projection 16 to be introduced into an open end of the groove 13 that is wider than the upper end portion of the projection 16, they can be assembled with ease and efficiently. Further, when the base portion 11 of the support member 10 is pushed against the vehicle floor 17 by means of bolts or screws (not shown) under the condition of the groove 13 and the projection 16 being fitted together, the inclined side portions of the groove 13 are urged against the corresponding inclined sides of the protrusion 16 so that the groove 13 and the protrusion 16 are urged to the positions where they are aligned with each other or where they are located correspondingly on the opposite sides of the boot 14, i.e., automatically aligned with each other, thus eliminating the possibility of the protrusion 16 misaligning with the groove 13.

A control lever 18 extends through a seal portion 14a of a boot 14 while being sealingly surrounded by the same. The control lever 18 is connected to a hinge collar 19 and passes through an opening 17a of the vehicle floor 17 and protrudes into the lower side of the vehicle floor 17. The hinge collar 19 is placed around a horizontal pivot shaft 20 so as to be rotatable on the same. The pivot shaft 20 is fixedly attached to the support member 10.

A shift lever 21 is disposed perpendicularly to the hinge collar 19 and fixedly attached at the lower end thereof to the hinge collar 19, so that the shift lever 21 is pivotally installed on the pivot shaft 20. A coil spring 22 and a rod 23 are disposed within the shift lever 21 in such a manner that the rod 23 is urged upward by the coil spring 22. A detent pin 24 is extends through the rod 23 and across the same at right angles. The detent pin 24 further extends through elongated openings 21a formed in the shift lever 21.

The shift lever 21 extends upward from a detent groove 25 so as to have a predetermined height and is finished decoratively by means of a covering 26 and penetrates through a slide plate 27 that is nearly horizontally fitted in the detent groove 25. An indicator 28 of the slide plate 27 is movably disposed under a dial plate 29 to indicate a shift position to which the shift lever 21 has been shifted. The slide plate 27 is fitted in a cover 31 of an indicator box 30 fixedly attached to the upper side of the support member 10.

Accordingly, when the rod 23 is pushed inward against the bias of the coil spring 22 by operating an unshown knob at the upper end portion of the shift lever 21, the detent pin 24 is disengaged from a detent notch to allow the shift lever 21 to move forward or rearward of the vehicle body into a desired shift position. When the knob is released from the push, the detent pin 24 is held in a predetermined position. In this instance, the control lever 18 is rotated together with the shift lever 21 in the reverse direction relative to the direction of rotation of the shift lever 21, to operate the transmission by way of a linkage (not shown). The knob, the shift lever 21, the rod 23, detent pin 24, etc. are substantially same as the arrangement described in U.S. Pat. No. 5,016,738. Since the boot 14 has an elasticity and is formed with a bellows portion 14b adjacent the seal portion 14a, it can be easily deformed by the rotation of the control lever 18, thus not causing any obstacle to the movement of the control lever 18. Further, since the seal projection 15 is effectively pushed at a portion corresponding to the width of the rib projection 12 against the vehicle floor 17, thus making it possible to prevent movement of the seal projection 15 while enabling the support member 10 to have a good dimensional accuracy and be free from a drawback on manufacture.

From the foregoing, it will be understood that according to the present invention the fitting relation between a groove of a trapezoidal cross section and a projection makes it possible to introduce the upper side portion of the projection into the open end of the groove that is wider than the upper side portion of the projection, thus making it possible to assemble the seal structure with ease and efficiency. Further when the support member is pushed against the vehicle floor by means of screws or bolts under the condition of the projection and the groove being fitted together, the slant or inclined sides of the groove are urged against the corresponding inclined sides of the projection, thus causing the groove and the projection to be assuredly aligned with each other so that the seal projection can be assuredly urged against the vehicle floor in a desired manner.

What is claimed is:

1. A sealing arrangement for a transmission shift control device for a vehicle having a support member adapted for mounting to a floor of the vehicle, comprising:

a base portion extending from the support member of the transmission shift control device;

a boot adapted to be interposed between said support member and the vehicle floor for providing a seal therebetween, the boot having a first looped seal projection adapted to sealingly contact said vehicle floor;

wherein said base portion has a looped groove of a trapezoidal cross section, and said boot has a second looped seal projection of a trapezoidal cross section and adapted to be sealingly engaged in said groove.

2. A sealing arrangement according to claim 1, wherein said first seal projection and said second seal projection are similar in loop shape and located correspondingly on opposite sides of said boot.

3. A sealing arrangement for an automatic transmission shift control device for a vehicle, the shift control device having a shift lever and a support member of a single piece resinous molding for pivotally supporting the shift lever and adapted for mounting to a floor of the vehicle, the sealing arrangement comprising:

a boot adapted to be interposed between the vehicle floor and the support member for providing a seal therebetween, the boot having on a lower side thereof a first looped seal projection adapted to sealingly contact the vehicle floor;

a looped groove of a trapezoidal cross section in a bottom of the support member; and a second looped seal projection of a trapezoidal cross section on an upper side of the boot and adapted to be sealingly engaged in said groove.

4. A sealing arrangement according to claim 3, further comprising a rib projection formed integral with the bottom of the support member, said groove being formed in said rib projection.

5. A sealing arrangement for an automatic transmission shift control device for a vehicle, the shift control device having a shift lever and a support member of a single piece resinous molding for pivotally supporting the shift lever and adapted for mounting to a floor of the vehicle, the sealing arrangement comprising:

a base portion extending from the support member;

a boot adapted to be interposed between said base portion and the vehicle floor for providing a seal therebetween, the boot having on a lower side thereof a first looped seal projection adapted to sealingly contact said vehicle floor;

wherein said base portion has a looped groove of a trapezoidal cross section, and said boot has on an upper side thereof a second looped seal projection of a trapezoidal cross section and adapted to be sealingly engaged in said groove; and wherein said first seal projection and said second seal projection are similar in loop shape and located correspondingly on opposite sides of said boot.

6. A sealing arrangement according to claim 5, further comprising a rib projection formed integral with the base portion of the support member, said groove being formed in said rib projection.

* * * * *